United States Patent Office 3,293,281
Patented Dec. 20, 1966

3,293,281
LOWER ALKYL BICYCLO(3.3.0)OCTANE
ACETATE DERIVATIVES
Rostyslaw Dowbenko, Gibsonia, Pa., assignor to Pittsburgh Plate Glass Company, Pittsburgh, Pa., a corporation of Pennsylvania
No Drawing. Filed Sept. 16, 1963, Ser. No. 309,328
8 Claims. (Cl. 260—468)

This invention relates to derivatives of bicyclo[3.3.0]octane, and more particularly to such derivatives formed transannular cycloadditions to 1,5-cyclooctadiene.

It is known that cyclic alkenes, such as cyclohexene, form 1 to 1 addition products with various reactive compounds. For example, the reaction of cyclohexene with carbon tetrachloride produces 1-trichloromethyl-2-chlorocyclohexane. It would be expected, therefore, that compounds such as 1,5-cyclooctadiene would produce a mixture of 1 to 1 and 1 to 2 adducts having similar structures.

It has been found, however, that 1,5-cyclooctadiene does not undergo simple addition reactions in many instances and that the reaction of 1,5-cyclooctadiene with certain alpha-halocarboxylic acid esters results in a transannular rearrangement to produce bicyclo 3.3.0]octane derivatives.

The bicyclo[3.3.0]octane derivatives to which this invention relates and which are produced as a result of the reaction of 1,5-cyclooctadiene with these esters comprise compounds in which a bicyclo[3.3.0]octyl group is substituted for one of the substituents on the alpha-carbon atom of the ester. The ester residue is attached to the bicyclo[3.3.0]octane nucleus in the 2-position, and the displaced substituent is attached in the 6-position. These products can be represented by the formula:

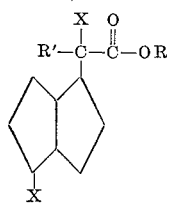

where R is a lower alkyl group, R' is hydrogen, halogen or lower alkyl, and X is hydrogen or halogen, at least one X being halogen. The lower alkyl groups mentioned generally have up to about 8 carbon atoms.

Among the esters which react with 1,5-cyclooctadiene to produce the aforesaid compounds are methyl chloroacetate, ethyl chloroacetate, propyl chloroacetate, butyl chloroacetate, hexyl chloroacetate, ethyl dichloroacetate, methyl trichloroacetate, ethyl trichloroacetate, butyl trichloroacetate, ethyl bromoacetate, ethyl tribromoacetate, ethyl 2-chloropropanoate, ethyl 2-chlorobutanoate, ethyl 2,3-dibromobutanoate, and other alkyl esters of halo-substituted saturated carboxylic acids of the formula:

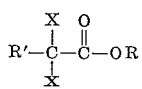

in which R, R' and X are as described above.

The reaction conditions used to produce the bicyclo[3.3.0]octane derivative from the ester and 1,5-cyclooctadiene are not critical. For instance, no solvent is necessary, although one can be employed if desired. Similarly, the ratio of reactants does not affect operability of the reaction, although better yields are obtained if an excess of the ester is present, and it is for this reason that a substantial stoichiometric excess of the ester is ordinarily utilized. Usually at least about 5 moles of ester per mole of 1,5-cyclooctadiene are present.

In general, the reaction should be carried out under conditions such that free radical catalyzed additions take place. A catalyst as such is not always necessary, but when a catalyst is not employed, elevated temperatures, 100° C. or higher, and preferably 150° C. to 250° C., should be employed. Alternatively, a free radical-producing catalyst may be utilized. Among the catalysts which are used are peroxides, azo compounds such as azobis-(isobutyronitrile), ultraviolet light, and similar known free radical-producing catalysts.

When a catalyst is present, the preferred temperature is that at which the catalyst yields free radicals at an appreciable rate. This temperature varies with the particular catalyst, for example, when using benzoyl peroxide, the temperature should be about 70° C. or higher; with azobis-(isobutyronitrile), 50° C. or higher; with di-(tertiary butyl)peroxide, 120° C. or higher; while with ultraviolet light, catalysis at room temperature is often satisfactory. Temperatures lower than those set forth may be employed, but tend to result in an undesirably slow rate of reaction.

The amount of catalyst is not critical and may be varied widely, with at least about 0.02 mole percent based on the 1,5-cyclooctadiene being ordinarily employed.

Set forth below are several examples which will serve to illustrate the method and practice of the invention.

EXAMPLE 1

Reaction of 1,5-cyclooctadiene with ethyl chloroacetate

A solution of 3.65 grams of di-t-butyl peroxide in 24 grams of ethyl chloroacetate was added over a period of 6½ hours to a reaction vessel containing 10.8 grams of 1,5-cyclooctadiene and 98.6 grams of ethyl chloroacetate at 140° C. The reaction mixture was heated at 140° C. for 7½ hours and then distilled to remove the unreacted ethyl chloroacetate. The remaining liquid was then redistilled and the fraction boiling at 70° C. at 0.08 millimeter pressure to 77° C. at 0.10 millimeter pressure was identified as ethyl 6-chlorobicyclo[3.3.0]octane-2-acetate, having the following structure:

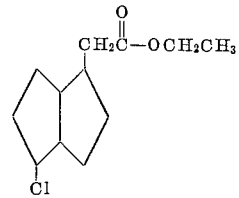

The product was identified by gas chromatographic, infrared and chemical analyses.

Analysis (calculated for $C_{12}H_{19}ClO_2$) — Calculated, percent: C, 62.47; H, 8.30; Cl, 15.36. Found, percent: C, 62.46, 62.57; H, 8.10, 8.26; Cl, 15.22, 15.44.

EXAMPLE 2

Reaction of 1,5-cyclooctadiene with ethyl trichloroacetate

A flask was charged with 21.6 grams of 1,5-cyclooctadiene and 170 grams of ethyl trichloroacetate. To this there was added over a period of 9 hours, a solution of 3.65 grams of di-t-butyl peroxide in 21.5 grams of ethyl trichloroacetate while maintaining the mixture at about 140° C. Heating was continued for an additional 3½ hours and then the mixture was distilled. The fraction boiling at 99° C. to 102° C. at 0.10 millimeter pressure was identified by gas chromatographic, infrared and chemical analyses as ethyl 6-chlorobicyclo[3.3.0]-octane- 2-(alpha,alpha-dichloro)-acetate, having the following structure:

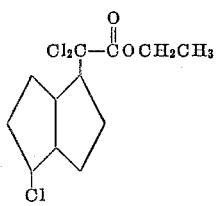

Analysis (calculated for $C_{12}H_{17}Cl_3O_2$)—Calculated, percent: C, 48.10; H, 5.72; Cl, 35.50. Found, percent: C, 48.62; H, 6.09; Cl, 35.87.

Using similar procedures as those exemplified above, corresponding products are obtained from the reaction of 1,5-cyclooctadiene with other esters of the class described. Thus, the following compounds are produced:

TABLE I

| Example | Ester | Product |
|---|---|---|
| 3 | Ethyl bromoacetate | Ethyl 6-bromobicyclo-[3.3.0] octane-2-acetate. |
| 4 | Ethyl dichloroacetate | Ethyl 6-chlorobicyclo-[3.3.0] octane alphachloroacetate. |
| 5 | Butyl 2,2-dichloropropanoate. | Butyl 6-chlorobicyclo-[3.3.0] octane 2-chloropropanoate. |

The compounds produced in accordance with this invention can be used for various purposes. For example, they are useful as plasticizers for resinous compositions, such as polyvinyl chloride. They are also valuable chemical intermediates and can be used to produce compounds such as the corresponding carboxylic acids, for example, by hydrolysis reactions.

They are also valuable as pesticides and fungicides, inhibiting the growth of common organisms of these types when applied thereto in low concentration in solution.

According to the provisions of the patent statutes, there are described above the invention and what are now considered to be its best embodiments. However, within the scope of the appended claims, it is to be understood that the invention may be practiced otherwise than as specifically described.

I claim:
1. A compound of the formula:

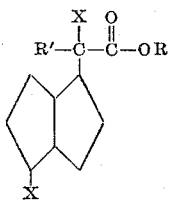

where R is a lower alkyl radical; R' is selected from the group consisting of hydrogen, halogen and lower alkyl radicals; and X is selected from the group consisting of hydrogen and halogen, at least one of the substituents represented by X being halogen.

2. The compound of claim 1 in which said halogen is chlorine.

3. A compound of the formula:

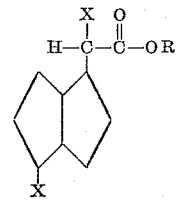

where R is a lower alkyl radical and X is selected from the group consisting of hydrogen and halogen, at least one of the substituents represented by X being halogen.

4. The compound of claim 3 in which said halogen is chlorine.

5. A compound of the formula:

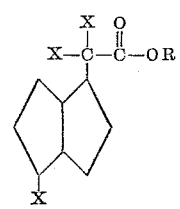

where R is a lower alkyl radical and X is halogen.

6. The compound of claim 5 in which said halogen is chlorine.

7. Ethyl 6-chlorobicyclo[3.3.0]octane-2 - (alpha,alpha, dichloro)acetate.

8. Ethyl 6-chlorobicyclo[3.3.0]octane-2-acetate.

References Cited by the Examiner

UNITED STATES PATENTS 2,567,026    9/1951    Pelton et al. _____ 260—468

OTHER REFERENCES

Pregagliu: "La Chimica e l'Industria," vol. 45, No. 9, pp. 1065–1068 (1963).

LORRAINE A. WEINBERGER, *Primary Examiner.*

R. K. JACKSON, *Assistant Examiner.*